United States Patent [19]

Horwitz et al.

[11] 3,878,534

[45] Apr. 15, 1975

[54] BIPOLAR FLOATING INPUT, PARTICULARLY FOR DIGITAL PANEL METERS

[75] Inventors: Joshua Horwitz; Bernard M. Gordon, both of Magnolia, Mass.

[73] Assignee: Gordon Engineering Company, Wakefield, Mass.

[22] Filed: Oct. 13, 1972

[21] Appl. No.: 297,502

Related U.S. Application Data

[62] Division of Ser. No. 125,078, March 17, 1971, Pat. No. 3,718,923, which is a division of Ser. No. 852,808, Aug. 25, 1969, abandoned.

[52] U.S. Cl. ............. 340/347 NT; 307/236; 328/26

[51] Int. Cl. ............................................ H03k 13/20

[58] Field of Search............... 340/347 NT, 347 AD; 235/155; 307/236, 109, 262, 236; 320/1 R, 25, 26; 330/30 R; 328/140, 26, 150

[56] References Cited

UNITED STATES PATENTS

| | | | |
|---|---|---|---|
| 3,219,839 | 11/1965 | Fletcher | 307/236 X |
| 3,368,149 | 2/1968 | Wasserman | 340/347 NT |
| 3,462,758 | 8/1969 | Reynal et al. | 340/347 NT |
| 3,531,656 | 9/1970 | Ammann | 328/26 |
| 3,535,500 | 10/1970 | Hu | 235/155 |
| 3,546,596 | 12/1970 | Beaudette | 328/26 |
| 3,564,430 | 2/1971 | Brudevold | 307/236 X |
| 3,577,140 | 5/1971 | Aasnaes | 340/347 NT |
| 3,582,947 | 6/1971 | Harrison | 340/347 NT |

*Primary Examiner*—Gareth D. Shaw
*Assistant Examiner*—Leo H. Boudreau
*Attorney, Agent, or Firm*—Weingarten, Maxham & Schurgin

[57] ABSTRACT

In a bipolar floating input device, particularly for dual-slope integration digital panel meters, an analog voltage is applied to a bipolar floating input circuit and a digital form of the analog voltage is presented by a display.

3 Claims, 6 Drawing Figures

BIPOLAR FLOATING INPUT, PARTICULARLY FOR DIGITAL PANEL METERS

CROSS REFERENCE TO RELATED APPLICATION

This is a division, of application Ser. No. 125,078, filed Mar. 17, 1971, now U.S. Pat. No. 3,718,923, which is a division of application Ser. No. 852,808, filed Aug. 25, 1969, now abandoned.

BACKGROUND AND SUMMARY

The present invention relates to panel meters, and more particularly to bipolar digital panel meters employing a dual-slope integration technique for converting analog data to digital form. In the dual-slope integration technique, analog to digital conversion is accomplished by applying a current proportional to an input analog voltage to a discharged capacitor for a predetermined sampling time, i.e., a predetermined number of clock pulses, and causing a charge to build up across the capacitor. After the sampling time interval, a reference current is applied to the charged capacitor in order to discharge the capacitor. A digital coded form of the analog input is specified as the number of clock pulses recorded in the time interval from completion of the sampling time until the capacitor is discharged to its reference condition. The digital coded form is decoded for presentation in numerical form by a display. Prior bipolar digital panel meters have been undesirably expensive and cumbersome.

A primary object of the present invention is to provde, particularly for digital panel meters, a novel bipolar floating input technique characterized by first and second drive amplifiers through which a current flows, first and second operational amplifiers for receiving a bipolar analog input and for controlling the conduction state of the first and second drive amplifiers, respectively, and a resistor connected serially between an inverting input of the first operational amplifier and an inverting input of the second operational amplifier, through which a current flows from the first drive amplifier to an output of the second operational amplifier and from the second drive amplifier to an output of the first drive amplifier. The combination of drive amplifiers, operational amplifiers and resistor is such as to provide a precise, reliable, inexpensive and compact bipolar digital panel meter.

Another object of the present invention is to provide, particularly for digital panel meters, an overload blanking circuit characterized by a logic configuration for providing a blanking signal to a numerical display, a "C" flip-flop for providing a first signal to the logic circuit, and a "K" flip-flop for providing a second signal to the logic circuit, whereby the display is blanked in an overload condition, i.e., the magnitude of the input analog signal exceeds the magnitude of the digital signal which the display is capable of presenting.

A further object of the present invention is to provide a novel panel meter front mounting technique characterized by a panel meter chassis having a housing wherein the panel meter components are generally mounted by conventional means, a faceplate which forms a lip, and a U-shaped bracket affixed to the rear of the panel meter and in juxtaposition with the sides of the panel meter chassis. The lip and bracket cooperate in such a manner as to fasten securely the panel meter chassis within an aperture of a panel, by the vise-like action of the lip and bracket.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description, taken in connection with the accompanying drawings wherein.

DETAILED DESCRIPTION

Figure 1:
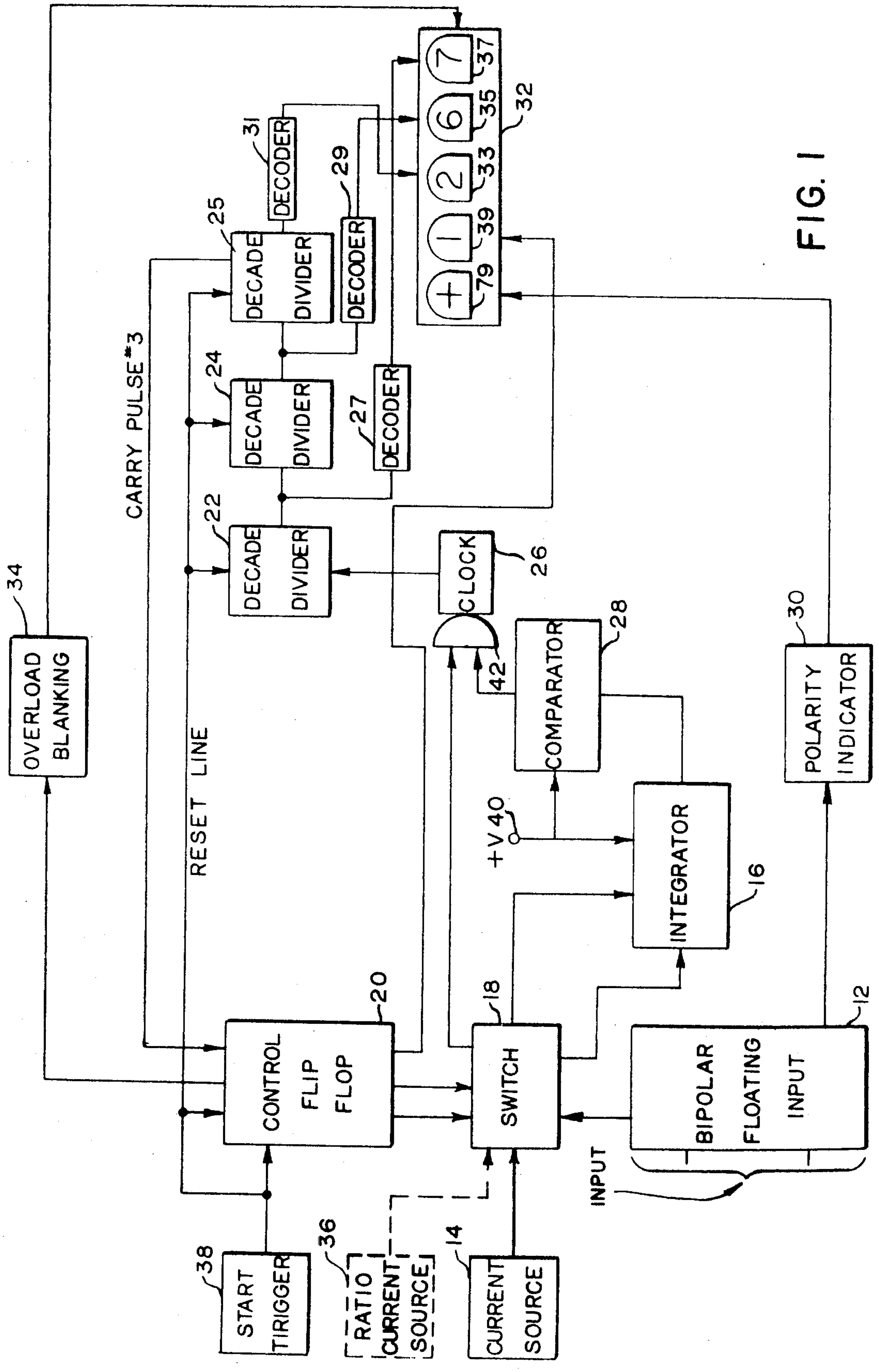
FIG. 1 is a block diagram, somewhat schematic, of a bipolar digital panel meter embodying the present invention.

Generally, the panel meter of FIG. 1 comprises a bipolar floating input 12 for receiving an input analog voltage, a current source 14 for generating a precision current, an integrator 16 for integrating a current from bipolar floating input 12 and the current from current source 14, a switch 18 for controlling the current being integrated in integrator 16, a control flip-flop 20 for controlling switch 18, decade dividers 22, 24, and 25 for supervising control flip-flop 20 and for providing output registers, a clock 26 for providing clock pulses to decade divider 22, a comparator 28 for controlling clock 26, a polarity sensor 30 for sensing the polarity of the input analog voltage, a plurality of decoders 27, 29, and 31 for decoding a digital signal in decade dividers 22, 24, and 25 respectively, a display 32 for presenting the input analog voltage in numerical form, and an overload blanking 34 for blanking display 32 in an overload condition. In a modified embodiment a ratio current source 36 is employed and the digital form, as presented by display 32, is a multiple or a fraction of the input analog signal.

In the device of FIG. 1, analog to digital conversion is initiated by a reset trigger which is generated from start trigger 38. Control flip-flop 20, decade dividers 22, 24, and 25 are set to a zero state. A voltage 40 is applied to integrator 16 which is charged to voltage 40. An input analog signal is applied to bipolar floating input 12. A discharge current flows from integrator 16 to the bipolar floating input 12 via switch 18, whereby the integrator is discharged. The discharge rate of integrator 16 is specified by the amplitude of the analog voltage and the discharge time is specified by a predetermined number of clock pulses from clock 26. For every tenth clock pulse applied to decade divider 22, a carry pulse No. 1 from decade divider 22 is applied to decade divider 24. For every tenth carry pulse No. 1 which is applied to decade divider 24, a carry pulse No. 2 from decade divider 24 is applied to decade divider 25. For every tenth carry pulse No. 2 which is applied to decade divider 25, a carry pulse No. 3 from decade divider 25 is applied to control flip-flop 20. Carry pulse No. 3 triggers control flip-flop 20 to a first state and causes switch 18 to assume a second state. When switch 18 is in the second state, the discharge current is prevented from flowing and a charging current from current source 14 is applied to integrator 16 via switch 18. Integrator 16 is charged to voltage 40 and an output pulse from comparator 28 is applied to a logic circuit 42 to stop clock 26. The number of clock pulses, which were generated by clock 26 while integrator 16 was charged to voltage 40, are recorded by decade dividers 22, 24, and 25. A digital output from decade dividers 22, 24, and 25 is applied to decoders 27, 29, and 31, respectively, for decoding. The decoded signal from decoders 27, 29, and 31 is applied to numerical indicators 33, 35, and 37, respectively. When a second carry pulse No. 3 is applied by decade divider 25 to control flip-flop 20, a signal from control flip-flop 20 causes a "1" to appear on a numerical indicator 39. The magnitude of the analog input is represented by the numerals which are displayed on numerical indicators 39, 33, 35, and 37. It will be understood that, in alternative embodiments, the number of numerical indicators is other than four, for example, five. Polarity sensor 30 and overload blanking 34 now will be described in connection with FiG. 2.

Figure 2:
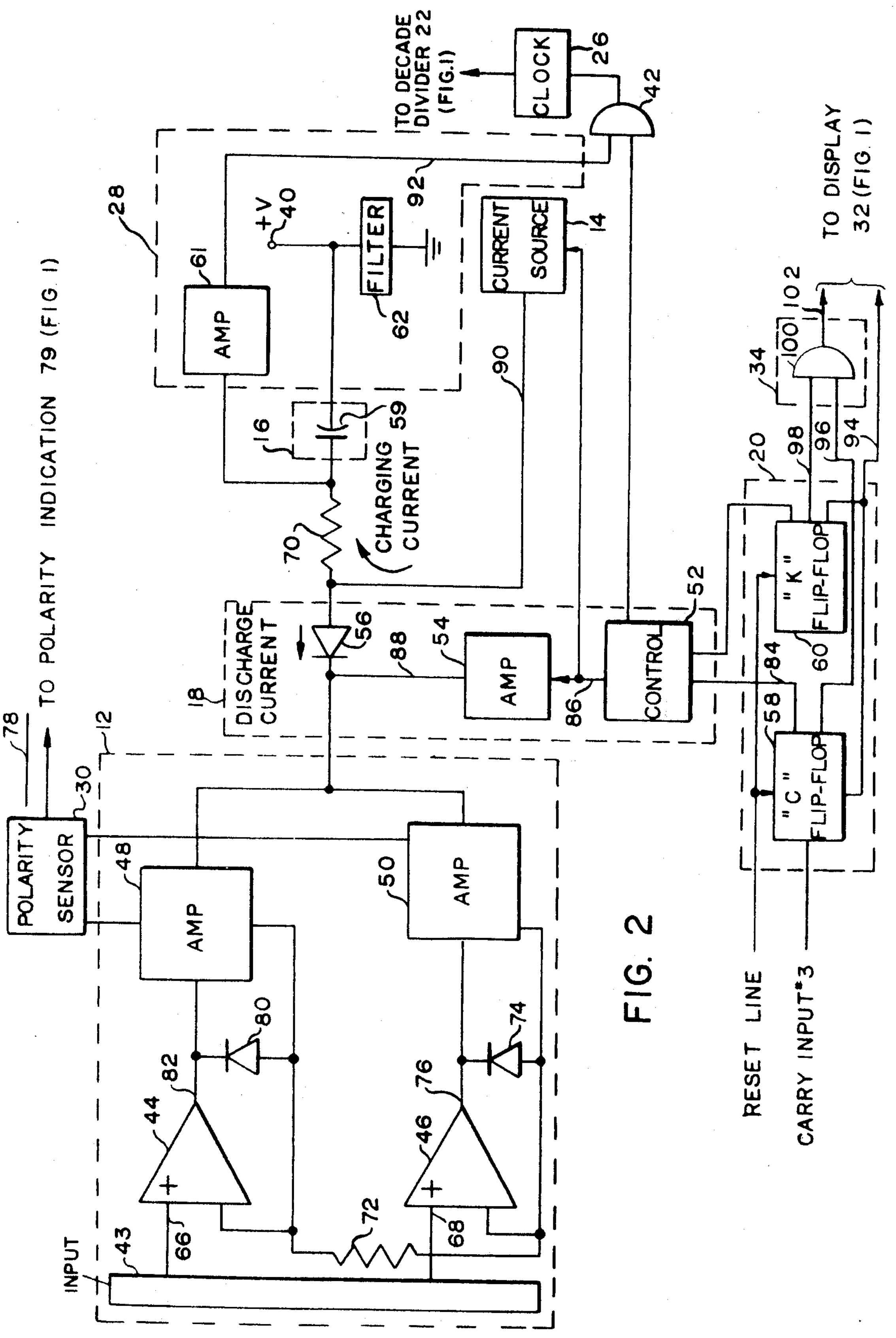
FIG. 2 is a block and schematic diagram of important details of FIG. 1.

FIG. 2 illustrates the details of bipolar floating input 12, current source 14, switch 18, comparator 28, and control flip-flop 20 of FIG. 1. In general, bipolar floating input 12 includes an input terminal 43 for receiving an analog input and two operational amplifiers 44 and 46 for controlling conduction of amplifiers 48 and 50, respectively. Generally, switch 18 includes a controller 52 for controlling the conduction of an amplifier 54 and a diode 56 for controlling the discharge current. Control flip flop 20 includes a C flip-flop 58 and a K flip-flop 60 for controlling clock 26, and overload blanking 34. Integrator 16 includes a capacitor 59 for integrating the analog input. In general, comparator 28 includes an amplifier 61 for controlling clock 26 and a filter 62 for filtering voltage 40.

In the bipolar floating input 12, a bipolar analog input is applied to inputs 66 and 68 of operational amplifiers 44 and 46 respectively. When the voltage as at 66 is positive with respect to the voltage as at 68, a positive output is applied by operational amplifier 44 to amplifier 48. When amplifier 48 conducts the discharge current flows from charged capacitor 59 (which has been charged to voltage 40), through a resistor 70, diode 56, amplifier 48, a resistor 72 and a diode 74 to an output 76 of operational amplifier 46. When amplifier 48 conducts, a large positive voltage 78 is generated by polarity sensor 30. Positive voltage 78 is applied to a polarity indicator 79 in display 32 and a "+" is presented on the polarity indicator (FIG. 1). When the voltage at 68 is positive with respect to the voltage at 66, a positive output is applied by operational amplifier 46 to amplifier 50. Amplifier 50 is energized in consequence of which a discharge current flows from charged capacitor 59 through resistor 70, diode 56, amplifier 50, resistor 72 and a diode 80 to an output 82 of operational amplifier 44. When amplifier 48 is not conducting, a small voltage is generated from polarity sensor 30 and a "–" is presented on polarity indicator 79. As previously stated in the description of FIG. 1, the discharge current continues to flow until carry pulse No. 3 is applied to control flip-flop 20. C flip-flop 58 is triggered into a state ONE by carry pulse No. 3 and an output 84 is applied to control 52 of switch 18. An output 86 from control 52 is applied to amplifier 54 and current source 14. A positive voltage 88 from amplifier 54 is applied to the cathode of diode 56 and the discharge current is prevented from flowing through diode 56. Output 86 is applied to current source 14 so that a charging current 90 is generated from current source 14. Charging current 90 is applied to capacitor 59 through resistor 70 so that a charge is built up across capacitor 59. When capacitor 59 is charged to the voltage 40, amplifier 61 is energized, an output 92 is applied to logic 42 and clock 26 is stopped. If a second carry pulse No. 3 is applied to C flip-flop 58, i.e. a second tenth carry pulse No. 2 is applied to decade divider 25, C flip-flop 58 is triggered to a state ZERO and K flip-flop 60 is triggered to a state ONE. In consequence, output 94 is applied to numerical indicator 39 in display 32 and a 1 is presented on numerical indicator 39 (FIG. 1). If a third carry pulse No. 3 is applied to C flip-flop 58, i.e. a third tenth carry pulse No. 2 is applied to decade divider 25, C flip-flop 58 is triggered to state ONE. If C flip-flop 58 is triggered to state ONE when K flip-flop 60 is in state ONE, signals 96 and 98 are applied to a logic circuit 100 in overload blanking 34. An output 102 is applied by overload blanking 34 to display 32, whereby no numerals are presented by display 32.

Figure 3:
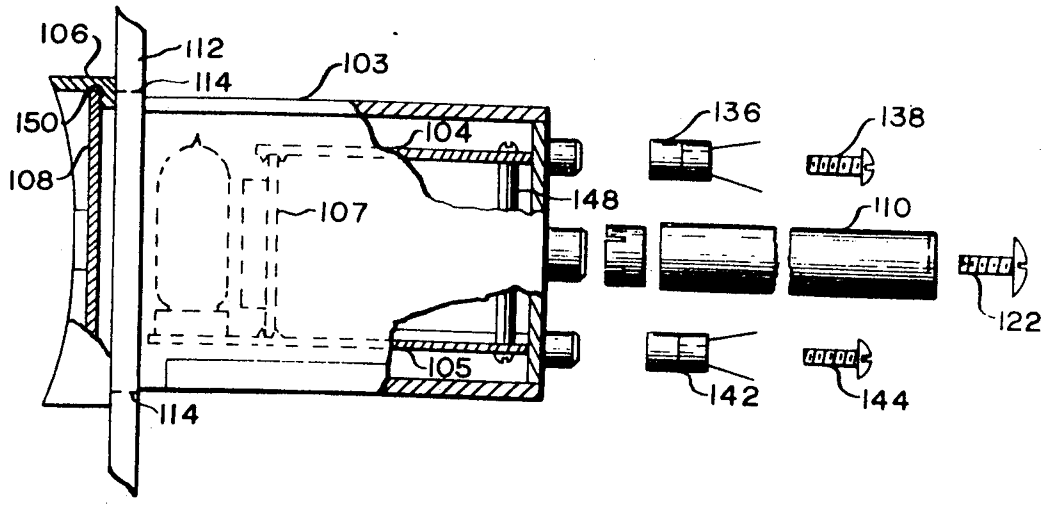
FIG. 3 is a side elevation, partly broken away, of the panel meter of FIG. 1.
Figure 4:
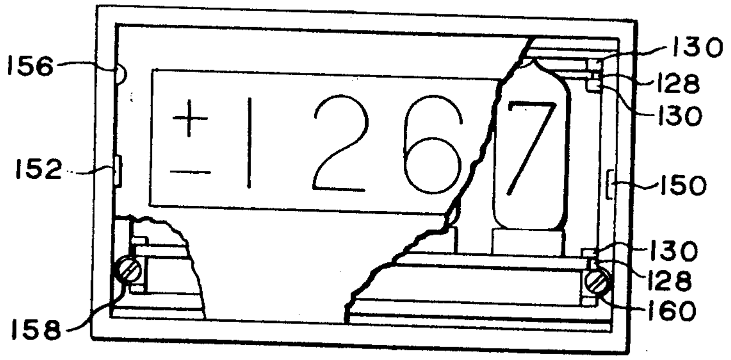
FIG. 4 is a front elevation, partly broken away, of FIG. 3.
Figure 5:
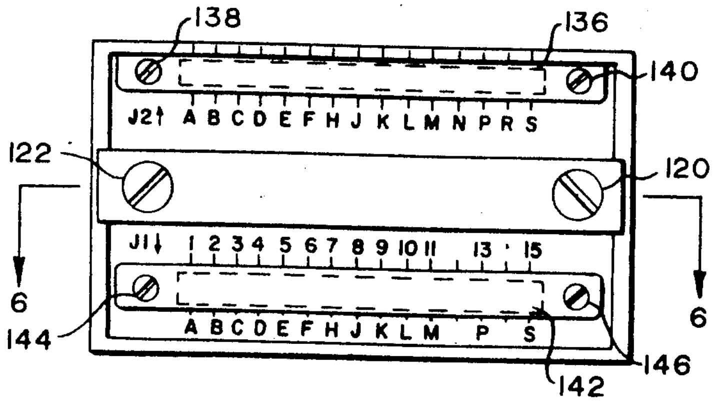
FIG. 5 is a rear elevation of FIG. 3.

FIG. 3, FIG. 4, and FIG. 5 illustrate a front panel and circuit board panel meter mounting techniques, which are characteristic of the panel meter of FIG. 1, in accordance with the present invention. Generally, the panel meter assembly comprises a chassis 103, wherein the components of FIG. 1 are generally mounted by conventional means on circuit boards 104, 105, and 107, a rim 106 extending circumferentially about a forward edge of chassis 103, a shield 108 which is removably seated in rim 106, a U-shaped bracket 110 which is provided for mounting chassis 103 in a panel 112.

Figure 6:
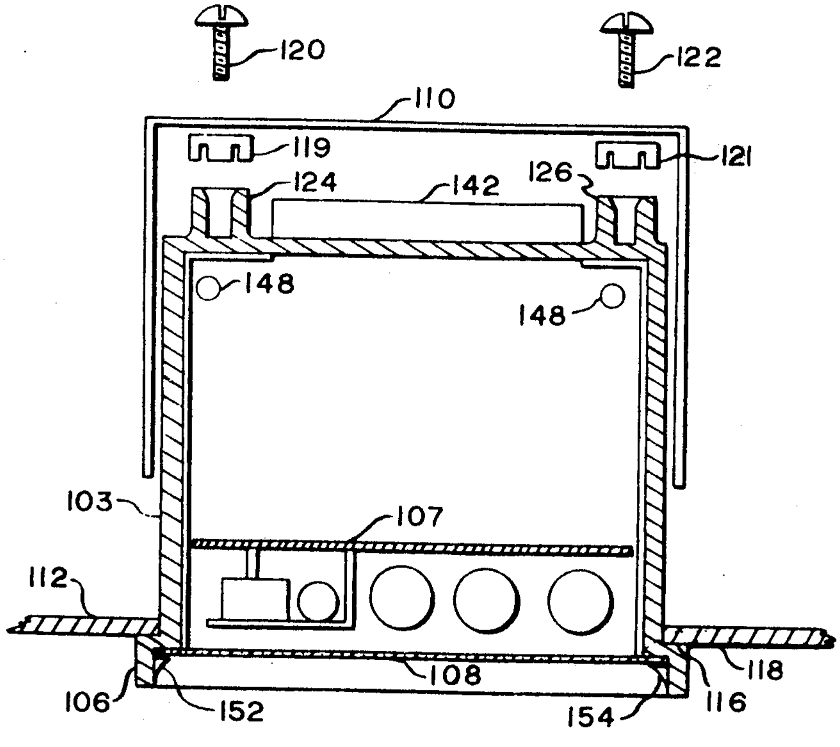
FIG. 6 is a section, taken along 6—6 of FIG. 5.

Details of the panel meter assembly front mounting technique are shown in FIG. 6. Generally, chassis 103 is received in an opening 114 of panel 112. Opening 114 is smaller than rim 106 and slightly larger than chassis 103. Rim 106 has a rearward facet 116, which is adapted to abut against the front face 118 of panel 112. Pressed nuts 119 and 121 are affixed firmly to bosses 124 and 126, respectively, and U-shaped bracket 110 is affixed to chassis 103 with fasteners, for example, screws 120 and 122. As screws 120 and 122 are threaded into bosses 124 and 126 respectively, bracket 110 is firmly pressed against panel 112. The panel meter assembly is securely fastened in panel 112 by the vise-like action of bracket 110 and rearward facet 116 on panel 112. Removal of the panel meter assembly is accomplished simply by removing screws 120 and 122 from bosses 124 and 126 respectively, and pulling chassis 103 forwardly through opening 114.

A clear understanding of the circuit board front mounting technique will be facilitated by a consideration of FIGS. 3, 4, 5, and 6. Generally, chassis 103 is provided with a plurality of parallel guides 128 formed by a plurality of ribs 103. Circuit boards 104 and 105 are removably seated in the parallel guides. Circuit board 103 is inserted into a jack 136, which is affixed to the rear of chassis 103 by fasteners, for example, screws 138 and 140. Circuit board 105 is inserted into a jack 142, which is affixed to the rear of chassis 103 by fasteners, for example, screws 144 and 146. Circuit boards 104 and 105 are held firmly apart by a plurality of spacer bars 148, whose ends are affixed to each of the circuit boards in such a manner that both circuit boards are inserted and removed as a unit. After circuit board 107 is inserted into chassis 103 and is affixed thereby to fasteners, for example, screws 158 and 160, shield 108 is removably inserted into a forward facet 150 of rim 106. Shield 108, which is composed of translucent plastic is sufficiently flexible to be removed readily but sufficiently rigid to be retained securely by fasteners 152 and 154. Shield 108 is provided with a notch 156, which facilitates removal of the shield. Removal of circuit boards 104 and 105 is accomplished by simply removing shield 108 and pulling the circuits boards away from jacks 136 and 142 and out of parallel guides 128.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A device for providing a digital display of the magnitude and sense of a bipolar analog voltage including an analog to digital converter and bipolar floating input means, said bipolar input means comprising:

a. floating input terminals for receiving a bipolalr analog voltage;

b. first amplifier means through which current can flow;

c. first operational amplifier means having a first input connected to a terminal of said bipolar input means and an inverting input and providing an output to said first amplifieir means for controlling the flow of current therethrough;

d. second amplifier means through which current can flow;

e. second operational amplifier means having a first input connected to a terminal of said bipolar input means and an inverting input and providing an output to said second amplifier means for controlling the flow of current therethrough; and f. a conductive path interconnecting said first and second amplifier means and said inverting inputs of said first and second operational amplifier means including resistor means serially connected between the inverting input of said first operational amplifier means and the inverting input of said second operational amplifier means, current flowing from said first amplifier means through said resistor means to an output of said second operational amplifier means when the analog voltage applied to said first operational amplifier means is positive with respect to said analog voltage applied to said second operational amplifier means and current flowing from said second amplifier means through said resistor means to an output of said first operational amplifier means when the analog voltage applied to said second operational amplifier means is positive with respect to said analog voltage applied to said first operational amplifier means, said current flowing from said first amplifier means through said resistor means to said output of said second operational amplifier means and said current flowing from said second amplifier means through said resistor means to said output of said first operational amplifier means operating as a discharging current;

said analog to digital converter means comprising:

g. current source means for providing a precision charging current;

h. integrator means connected to said first and second amplifier means and providing a current flow therethrough and to said current source means and operative for integrating said discharging current and said charging current, the amplitude of said discharging current being specified by said analog input, and the amplitude of said charging current being specified by said current source means;

i. switch means for determining the duration of said discharging current being integrated by said integrator means;

j. control flip-flop means for operating said switch means and providing an output thereto;

k. clock means for generating a sequence of predeterminedly timed clock pulses;

l. a plurality of decade divider means for recording said clock pulses and providing an output to said control flip-flop means, operative to change the state thereof;

m. comparator means for comparing a voltage at said integrator means with a predetermined reference voltage and operative to provide an output signal to said clock means preventing the operation thereof when said voltage at said integrator means reaches said predetermined reference voltage;

n. a plurality of decoder means for decoding said signals recorded in said decade divider means;

o. polarity sensor means for providing an output indication of the polarity of said analog input in response to the relative polarity of the analog signals applied to said floating input terminals; and p. display means for receiving decoded signals from said decoder means and an output indication of polarity from said polarity sensor, whereby the magnitude and sense of said analog input is presented in digital form by said display.

2. The device of claim 1 wherein said display means includes a plurality of numerical indicator means, whereby said analog input is presented by said display means in numerical form.

3. A device for providing a digital display of the magnitude and sense of a bipolar analog voltage including an analog to digital converter and bipolar floating input means, said bipolar input means comprising:

a. first amplifier means having conducting and non-conducting states;

b. second amplifier means having conducting and non-conducting states;

c. first floating operational amplifier means having first and second input terminals and an output terminal, said first floating operational amplifier means second input terminal operatively connected to said first amplifier means for controlling the state thereof;

d. second floating operational amplifier means having first and second input terminals and an output terminal, said second floating operational amplifier means second input terminal operatively connected to said second amplifier means for controlling the state thereof, the bipolar signal being applied between said first input terminals;

e. resistor means serially connected between said first floating operational amplifier second input terminal and said second floating operational amplifier second input terminal; and f. means for establishing a discharge current flow through said first amplifier means and resistor means to said second floating operational amplifier means when said first amplifier means is in the conducting state, said first amplifier means being in the conducting state when said first floating operational amplifier means first input terminal is positive with respect to said second floating operational amplifier means first input terminal;

g. means for establishing a discharge current flow through said second amplifier means and resistor means to said first floating operational amplifier means when said second amplifier means is in the conducting state, said second amplifier means being in the conducting state when said second float-operational amplifier means first input terminal is positive with respect to said first floating operational amplifier means first input terminal;

said analog to digital converter means comprising:

h. current source means for providing a precision charging current;

i. integrator means forming a discharge current path with said first and second amplifier means and receiving said charging current from said current source means for integrating said discharging current and said charging current, the amplitude of said discharging current being specified by said analog input, and the amplitude of said charging current being specified by said current source means;

j. switch means for determining the duration of said discharging current being integrated by said integrator means;

k. control flip-flop means for operating said switch means and providing an output thereto;

l. clock means for generating a sequence of predeterminedly timed clock pulses;

m. a plurality of decade divider means for recording said clock pulses and providing an output to said control flip-flop means, operative to change the state thereof;

n. comparator means for comparing a voltage at said integrator means with a predetermined reference voltage and operative to provide an output signal to said clock means preventing the operation thereof when said voltage at said integrator means reaches said predetermined reference voltage;

o. a plurality of decoder means for decoding said signals recorded in said decade divider means;

p. polarity sensor means for providing an output indication of the polarity of said analog voltage input in response to the relative polarity of the respective first inputs of said first and second floating operational amplifier means; and q. display means for receiving decoded signals from said decoder means and an output indication of polarity from said polarity sensor, whereby said analog input is presented in digital form by said display.

* * * * *